United States Patent
Hosoe et al.

(10) Patent No.: US 9,150,217 B2
(45) Date of Patent: Oct. 6, 2015

(54) DRIVE CONTROL APPARATUS AND CONTROL METHOD FOR HYBRID VEHICLES AND HYBRID VEHICLE

(75) Inventors: Yukihiro Hosoe, Shizuoka (JP); Yoshiki Ito, Shizuoka (JP); Masaaki Tagawa, Shizuoka (JP); Hitoshi Ohkuma, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 34 days.

(21) Appl. No.: 13/981,005

(22) PCT Filed: Jan. 31, 2011

(86) PCT No.: PCT/JP2011/000533
§ 371 (c)(1),
(2), (4) Date: Jul. 22, 2013

(87) PCT Pub. No.: WO2012/104904
PCT Pub. Date: Aug. 9, 2012

(65) Prior Publication Data
US 2013/0304294 A1    Nov. 14, 2013

(51) Int. Cl.
*B60W 20/00* (2006.01)
*B60L 15/00* (2006.01)
(Continued)

(52) U.S. Cl.
CPC .............. *B60W 20/108* (2013.01); *B60L 15/00* (2013.01); *B60W 10/06* (2013.01); *B60W 10/08* (2013.01); *B60W 20/00* (2013.01); *B60W 30/184* (2013.01); *B60K 6/445* (2013.01); *B60W 30/1882* (2013.01); *B60W 2710/0644* (2013.01); *B60W 2710/0666* (2013.01);
(Continued)

(58) Field of Classification Search
None
See application file for complete search history.

(56) References Cited

U.S. PATENT DOCUMENTS

2004/0249525 A1    12/2004    Okoshi et al.
2012/0158225 A1*    6/2012    Books et al. .................... 701/22

FOREIGN PATENT DOCUMENTS

| JP | 2001-304010 A | 10/2001 |
| JP | 2004-153946 A | 5/2004 |

(Continued)

OTHER PUBLICATIONS

International Search Report mailed Apr. 5, 2011 in PCT/JP2011/000533.
The First Office Action mailed Apr. 27, 2015 in corresponding Chinese Patent Application No. 201180066383.7 (with an English translation) (17 pages).

*Primary Examiner* — John R Olszewski
*Assistant Examiner* — Gerrad A Foster
(74) *Attorney, Agent, or Firm* — Rothwell, Figg, Ernst & Manbeck, P.C.

(57) ABSTRACT

A drive control apparatus for hybrid vehicles adapted to facilitate controlling a rotation speed of an internal combustion engine, preventing excess speeds of a motor generator. The drive control apparatus for hybrid vehicles is adapted for a drive control of a vehicle using outputs from an engine and motor generators, and includes a target engine operating point setter for setting up a target engine operating point to determine target engine torque and a target engine rotation speed of the engine from target engine power and an efficiency of system. A motor torque command value calculator sets up respective torque command values of the motor generators, and an engine torque corrector corrects the target engine torque by a target engine torque correction value set up based on the torque command values of the motor generators and permissible output torque of the motor generators.

15 Claims, 13 Drawing Sheets

(51) Int. Cl.
*B60W 10/06* (2006.01)
*B60W 10/08* (2006.01)
*B60W 30/184* (2012.01)
B60W 30/188 (2012.01)
B60K 6/445 (2007.10)

(52) U.S. Cl.
CPC ... *B60W 2710/081* (2013.01); *B60W 2710/083* (2013.01); *Y02T 10/6239* (2013.01); *Y02T 10/6286* (2013.01); *Y10S 903/903* (2013.01)

(56) References Cited

FOREIGN PATENT DOCUMENTS

| | | |
|---|---|---|
| JP | 2004-360608 A | 12/2004 |
| JP | 2007-55287 A | 3/2007 |
| JP | 2007-296937 A | 11/2007 |
| JP | 2008-247205 A | 10/2008 |

\* cited by examiner

DRIVE CONTROL APPARATUS AND CONTROL METHOD FOR HYBRID VEHICLES AND HYBRID VEHICLE

CROSS REFERENCE TO RELATED APPLICATION

This application is a 35 U.S.C. 371 National Phase Entry Application from PCT/JP2011/000533, filed Jan. 31, 2011, the disclosure of which is incorporated herein in its entirety by reference.

TECHNICAL FIELD

The present invention relates to drive control technologies for hybrid vehicles affording to prevent over speeds of a motor generator.

BACKGROUND ART

There have been proposals made for hybrid vehicles including a motor generator besides an internal combustion engine (referred herein sometimes simply as an engine) for traction use. In those hybrid vehicles, the motor generator has permissible output torque that can be output such as when driving or when generating electricity, as it is determined by inherent characteristics. The permissible output torque is substantially constant within a predetermined revolution number range (as a rotation speed range) constituting a normal service range of the motor generator.

When the internal combustion engine has a varied output characteristic due to disturbances such as variations in the environment, such as those in the temperature of suction air or in the atmospheric pressure, for instance, the motor generator being driven to rotate may have a revolution number exceeding a specific upper limit of revolution number, reaching a high revolution number range, entering an over-speed state. Like this, when the motor generator is over-speeded, the permissible output torque of the motor generator tends to more approach to a zero than a constant value in the normal service range. That is, the motor generator has a decreased absolute value of torque. If the motor generator is given a command for an absolute value of torque to be smaller than the absolute value of its permissible output torque, it can produce a value of torque matching the command torque. However, if the motor generator is given a command for an absolute value of torque to be larger than the absolute value of its permissible output torque, it fails to produce any value of torque matching the command torque. There is torque produced at the motor generator, which is limited to the permissible output torque or smaller, so the produced torque becomes extremely limited as the permissible output torque gets smaller in the absolute value, approaching a zero. Such being the case, there were situations involving a motor generator failing to produce necessary torque, causing a failed control in a driving system including the motor generator, as an inconvenience constituting an obstacle to the running of a vehicle.

There are known technologies for controlling output torque of an internal combustion engine to prevent such over speeds of a motor generator (refer to the PTL 1 and PTL 2 below, for instance). The PTL 1 has disclosed a technology of making a control based on a maximum output correction value set to a maximum output of a motor generator, giving an allowance value, which permits a prevention to be achieved against over speeds of the motor generator. The PTL 2 has disclosed a technology for a correction to be made, when an engine control unit (ECU) has determined an abnormality in communications with a control unit for hybrid use, in the manner of decreasing a target revolution number in a revolution number feedback control for an internal combustion engine, in accordance with output torque of the internal combustion engine. In other words, according to the technology disclosed in the PTL 2, the internal combustion engine has a revolution number controlled to keep a motor generator from over-speeding.

CITATION LIST

Patent Literature

PTL 1: JP 2001-304010A
PTL 2: JP2007-55287 A

SUMMARY OF INVENTION

Technical Problem

However, the technology disclosed in the PTL 1 had a range always limited by the fraction for an allowance value, as a problem leaving a room for improvement. Further, the technology disclosed in the PTL 2 was for an independent control to be performed upon a communication abnormality, as a control taking no thought for the magnitude of torque commanded to a motor generator.

The present invention has been devised in view of the foregoing problems. It is an object of the present invention to facilitate controlling a rotation speed of an internal combustion engine, preventing over speeds of a motor generator.

Solution to Problem

According to a first aspect of the present invention, there is provided a drive control apparatus adapted for a drive control of a hybrid vehicle using outputs from an internal combustion engine and a motor generator. The drive control apparatus includes a target engine torque setter, a motor torque command value calculator, and an engine torque corrector. The target engine torque setter is made to set up target engine torque of the internal combustion engine from target engine power and an efficiency of the system entirety. The motor torque command value calculator is made to set up a torque command value of the motor generator. The engine torque corrector is made up to make a correction of the target engine torque by a target engine torque correction value set up based on permissible output torque and the torque command value of the motor generator.

According to the first aspect, the engine torque corrector may be adapted to make the correction of the target engine torque when the permissible output torque of the motor generator has an absolute value smaller than an absolute value of the torque command value.

According to the first aspect, the engine torque corrector may include a permissible output torque calculator, a difference torque calculator, an engine torque correction component calculator, a resultant torque calculator, and a target engine torque correction value setter. The permissible output torque calculator may be made up to calculate permissible output torque of the motor generator based on a revolution number of the motor generator. The difference torque calculator may be made up to calculate difference torque between the permissible output torque and the torque command value of the motor generator. The engine torque correction component calculator may be made up to make a conversion of the difference torque to calculate an engine torque correction component. The resultant torque calculator may be made up to make an addition between the target engine torque and the engine torque correction component to calculate resultant torque. The target engine torque correction value setter may be made to set up the target engine torque correction value based on the resultant torque.

According to the first aspect, the engine torque corrector may be made up to set minimum engine torque to the target engine torque, and the target engine torque correction value setter may be made up to take the minimum engine torque or the resultant torque, whichever is larger after a comparison in between, to set to the target engine torque correction value.

The first aspect may include: the motor generator being composed of a pair of a first motor generator and a second motor generator; a planetary gear set having four elements being the internal combustion engine, the first motor generator, the second motor generator, and an output section connected on a collinear diagram in the order of the first motor generator, the internal combustion engine, the output section, and the second motor generator; and the engine torque corrector being adapted to set up the target engine torque correction value for the correction of the target engine torque based on permissible output torque of the first motor generator and the torque command value of the first motor generator.

According to the first aspect, there may be a configuration having the target engine torque setter included in a target engine operating point setter made to set up a target engine operating point to determine a target engine rotation speed and the target engine torque of the internal combustion engine from an efficiency of the system entirety and target engine power.

The first aspect may include a target engine power calculator made up to calculate the target engine power from target drive power and target charge-discharge power. There may be a configuration including a target drive power calculator made up to set the target drive power based on an accelerator opening and a vehicle speed.

The first aspect may include a target charge-discharge power calculator made up to calculate the target charge-discharge power based on a state of charge of a battery. There may be a configuration including an accelerator opening detector made up to detect the accelerator opening.

The first aspect may include a vehicle speed detector made up to detect the vehicle speed. There may be a configuration including a battery charge state detector made up to detect the state of charge of the battery.

According to a second aspect of the present invention, there is provided a drive control method for hybrid vehicles adapted for a drive control of a vehicle using outputs from an internal combustion engine and a motor generator. The drive control method for hybrid vehicles includes making a control to decrease target engine torque of the internal combustion engine set up from target engine power and an efficiency of the system entirety, when permissible output torque of the motor generator has an absolute value smaller than a torque command value.

It is preferable for the second aspect to include setting minimum engine torque to the target engine torque, and making a control when the target engine torque is decreased, to keep the target engine torque from getting lower than the minimum engine torque.

According to a third aspect of the present invention, there is provided a hybrid vehicle having mounted a drive control apparatus according to the first aspect.

Advantageous Effects of Invention

According to the first aspect of the present invention, there is provided a drive control apparatus for hybrid vehicles adapted for suppression of engine torque by a correction of target engine torque depending on a relationship between a torque command value and permissible output torque of a motor generator, allowing for a facilitated control of the engine rotation speed, with a resultant over-speed prevention of the motor generator, as an advantageous effect.

Moreover, according to the first aspect of the present invention, there is a point of time when the absolute value of the permissible output torque at the motor generator has become smaller than the absolute value of the torque command value, which can be taken as a trigger to make a control. This permits a correction of the target engine torque to be made before the motor generator enters an over-speed state in a case, affording to reduce the engine revolution number in a rapid manner. As a result, over speeds of the motor generator can be prevented. In addition, according to the first aspect, when the absolute value of the permissible output torque at the motor generator has become smaller than the absolute value of the torque command value, this time point is taken as a trigger to make a control, keeping the control for over-speed prevention of the motor generator from being made more than required, allowing for a reduced unnecessary suppression of output torque at the internal combustion engine.

Further, according to the first aspect of the present invention, in cases the motor generator has a revolution number reaching an upper limit of revolution number, there can be the minimum necessary of target engine torque saved even under a condition involving a significant suppression of target engine torque due to a relationship between the torque command value and the permissible output torque of the motor generator. According to the first aspect, engine torque can thus be stable, with secured system integrity.

According to the second aspect of the present invention, there is provided a drive control method affording to take, as a trigger, the time point when the absolute value of permissible output torque at a motor generator has become smaller than a torque command value. This permits a control for over-speed prevention of the motor generator to be kept from being made more than required, allowing for a reduced unnecessary suppression of output torque at an internal combustion engine.

Further, according to the second aspect of the present invention, there can be the minimum necessary of target engine torque saved even under a condition involving a significant suppression of target engine torque. According to the second aspect, engine torque can thus be stable, with secured system integrity.

According to the third aspect of the present invention, there is provided a hybrid vehicle adapted to prevent over speeds of a motor generator, keeping a driving system from getting uncontrollable, allowing for an ensured stable travelling, as an advantageous effect.

EMBODIMENTS OF INVENTION

According to embodiments of the present invention, there is provided a hybrid vehicle adapted to travel using outputs from an internal combustion engine and a motor generator, under a drive control. The hybrid vehicle has mounted thereon a drive control apparatus including a target engine operating point setter, and a motor torque command value calculator. The target engine operating point setter is made to set up a target engine operating point for use to determine a target engine rotation speed and target engine torque of the internal combustion engine based on an efficiency of the system entirety and target engine power. The motor torque command value calculator works for paired motor generators, as an implement for setting respective torque command values thereto. The drive control apparatus mounted on the hybrid vehicle is made up to control the target engine torque, to decrease the torque by a correction thereto using a target engine torque correction value it has set up in accordance with the torque command values to the motor generators and permissible output torque of the motor generators.

There will be described particulars of a hybrid vehicle according to an embodiment of the present invention, as well as a drive control apparatus mounted thereon, with reference to FIG. 1 through FIG. 13.

Figure 1:
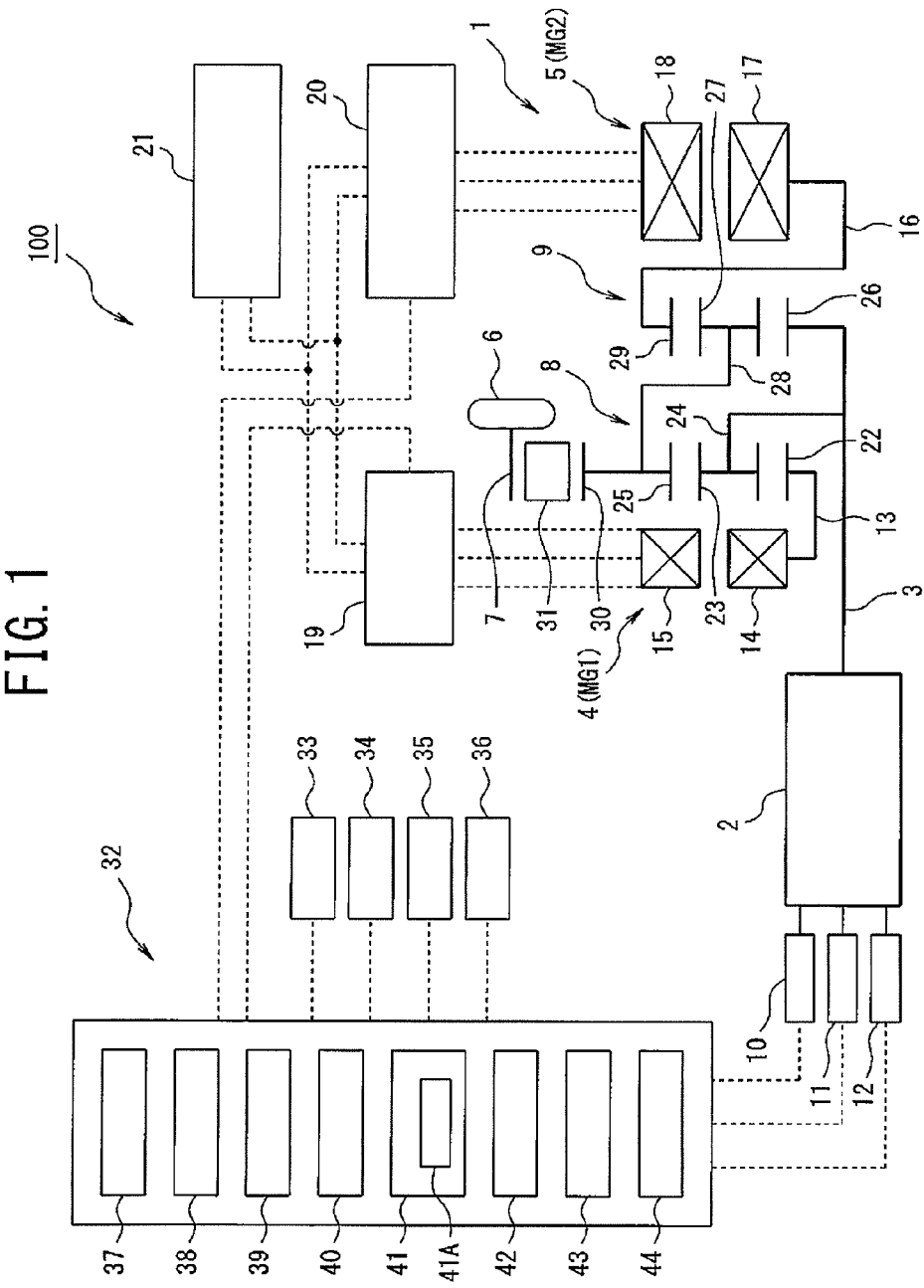
FIG. 1 is a system configuration diagram of a drive control apparatus for hybrid vehicles according to an embodiment of the present invention.
Figure 2:
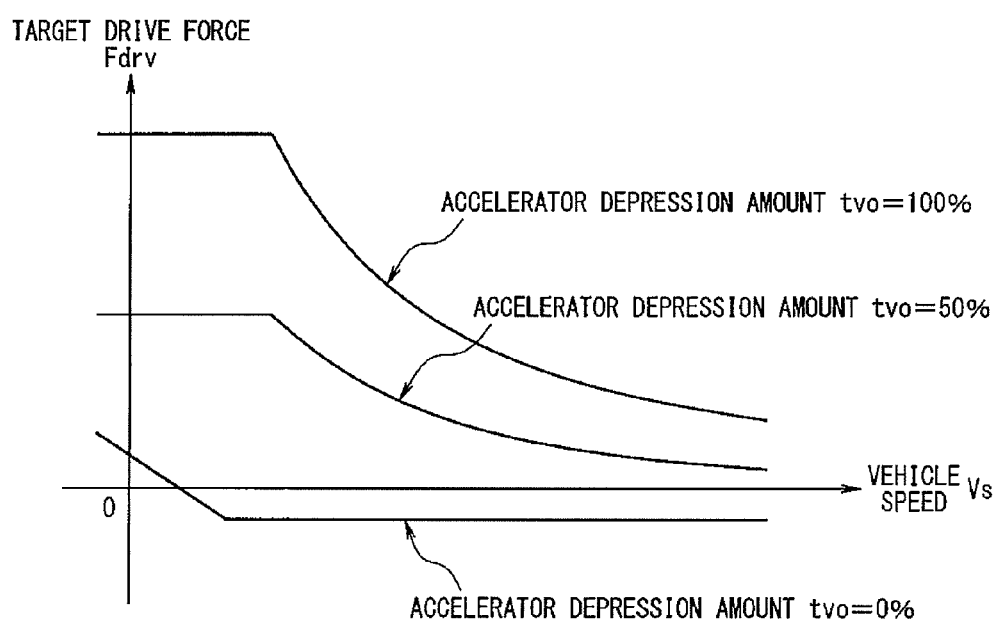
FIG. 2 is a graph showing a target drive force retrieval map to be referred to when setting up a target drive force at a target drive force setter.
Figure 3:
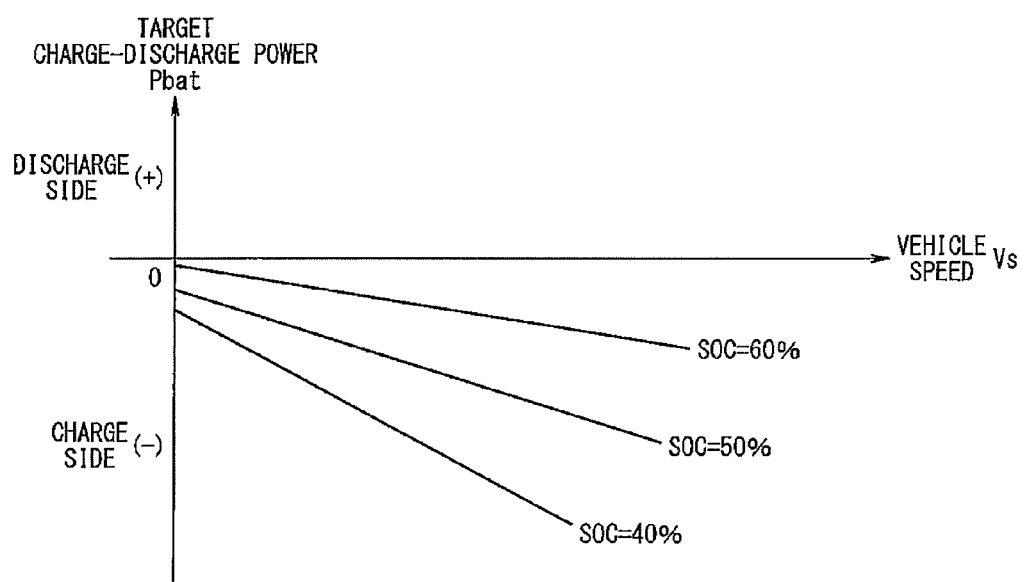
FIG. 3 is a graph showing a target charge-discharge power retrieval map to be referred to when setting up target charge-discharge power at a target charge-discharge power setter.
Figure 4:
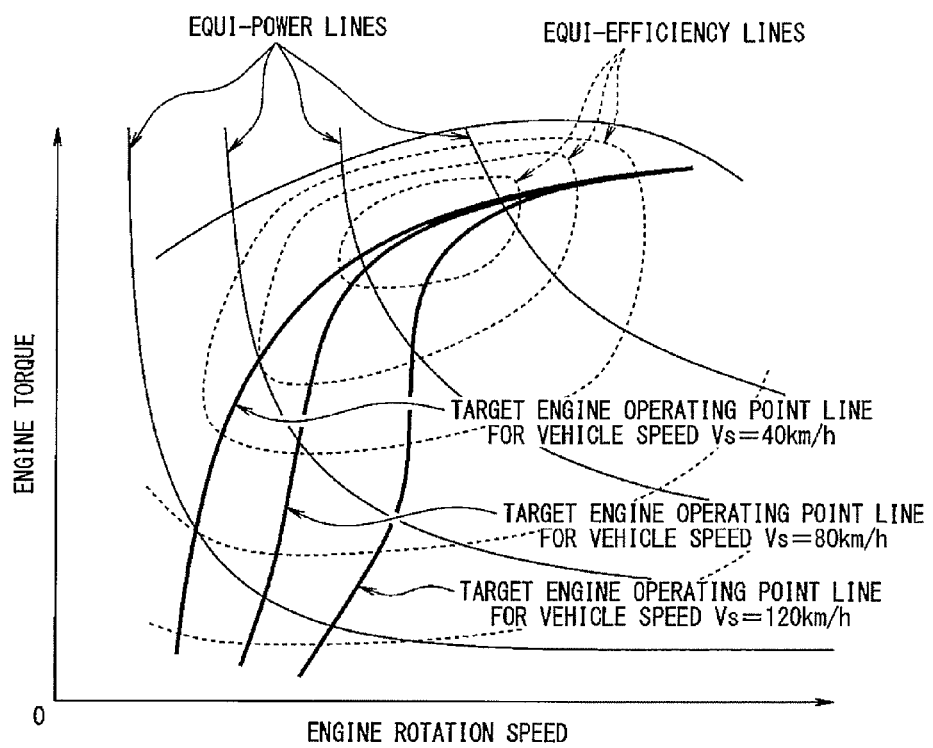
FIG. 4 is a graph showing a target engine operating point retrieval map to be referred to when setting up a target engine operating point at a target engine operating point setter.
Figure 5:
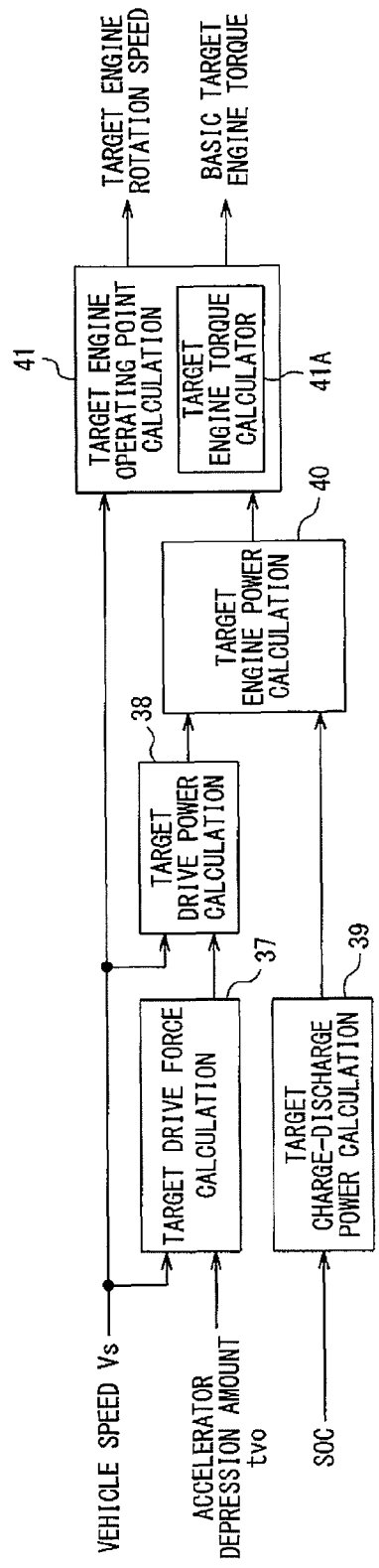
FIG. 5 is a control block diagram of the target engine operating point setter.
Figure 6:
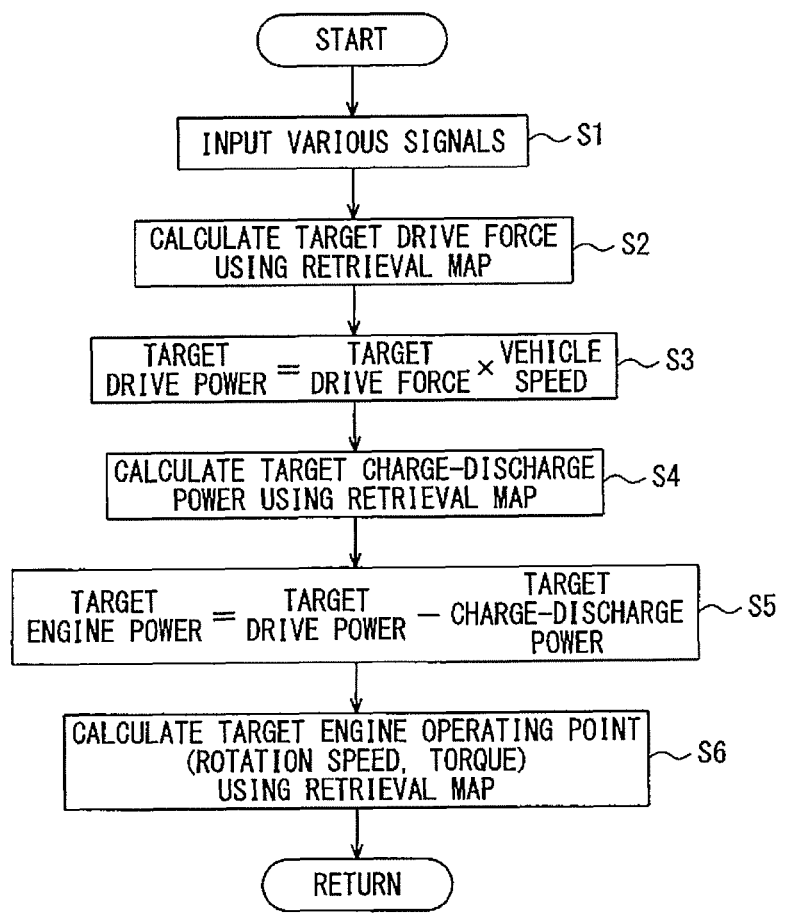
FIG. 6 is a flowchart showing a flow of control at the target engine operating point setter.
Figure 7:
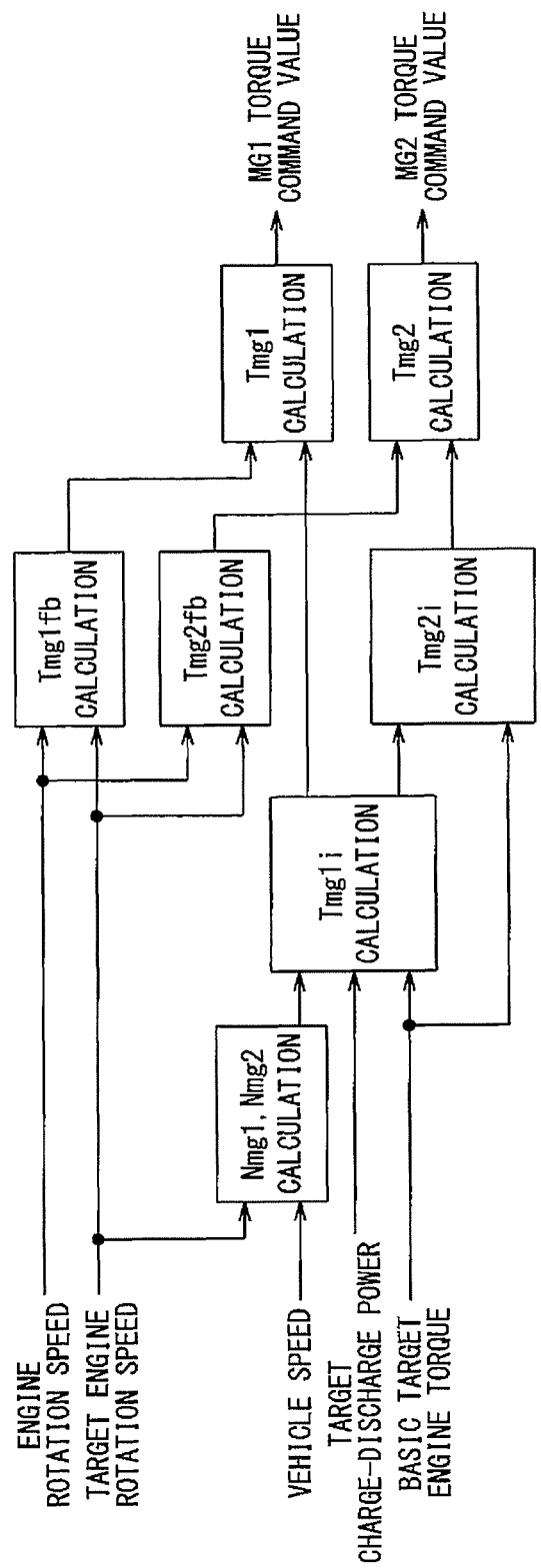
FIG. 7 is a control block diagram of a motor torque command value calculator.
Figure 8:
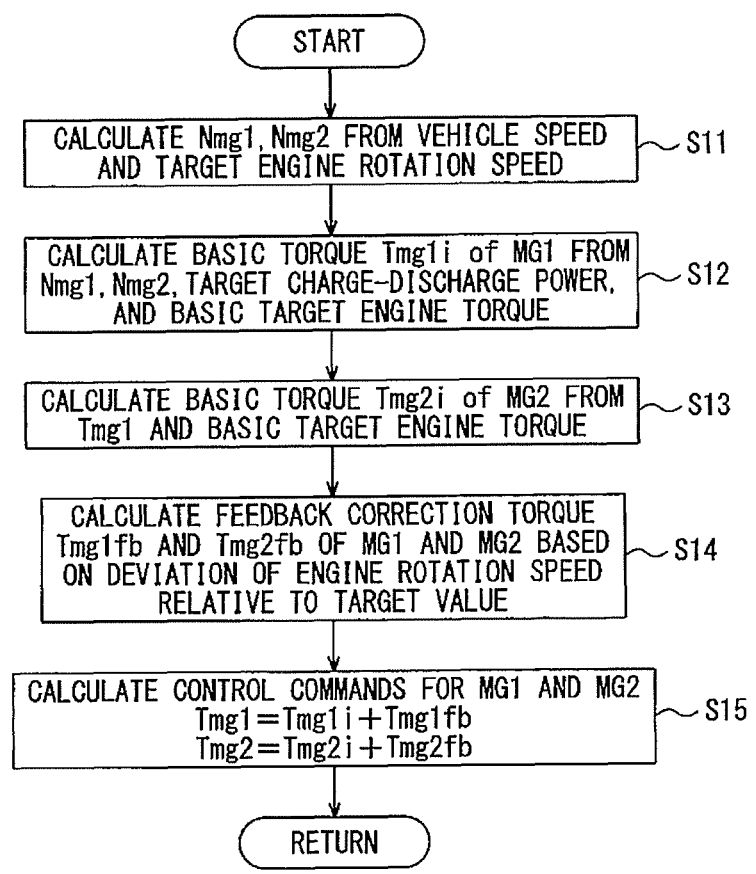
FIG. 8 is a flowchart showing a flow of control at the motor torque command value calculator.
Figure 9:
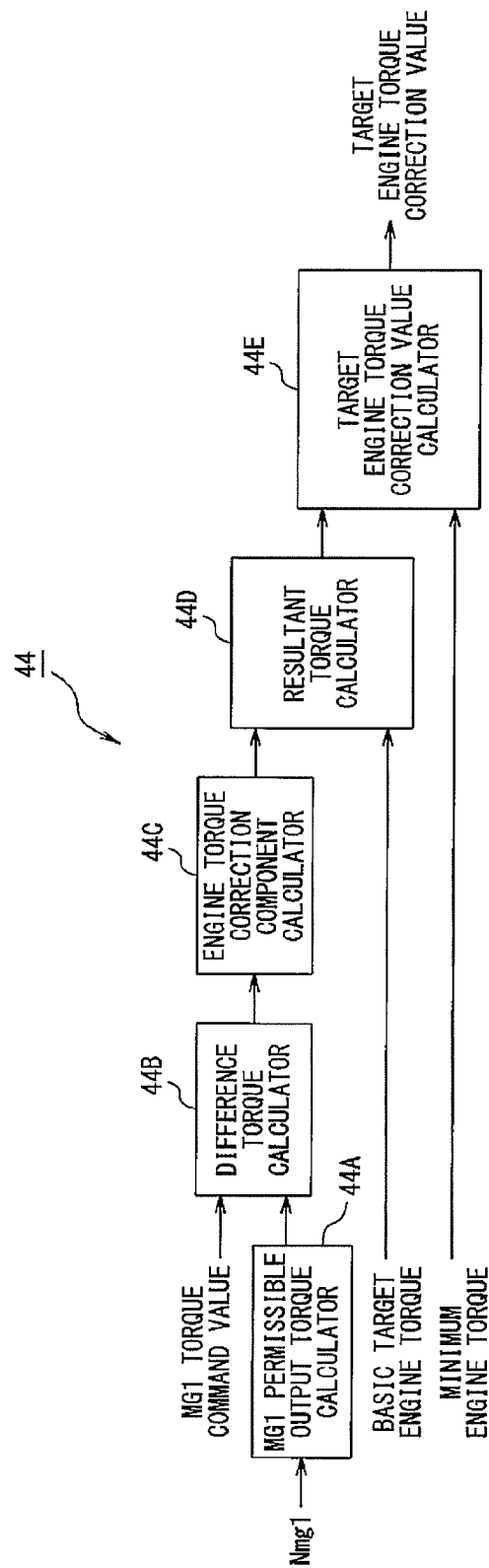
FIG. 9 is a control block diagram of an engine torque corrector.
Figure 10:
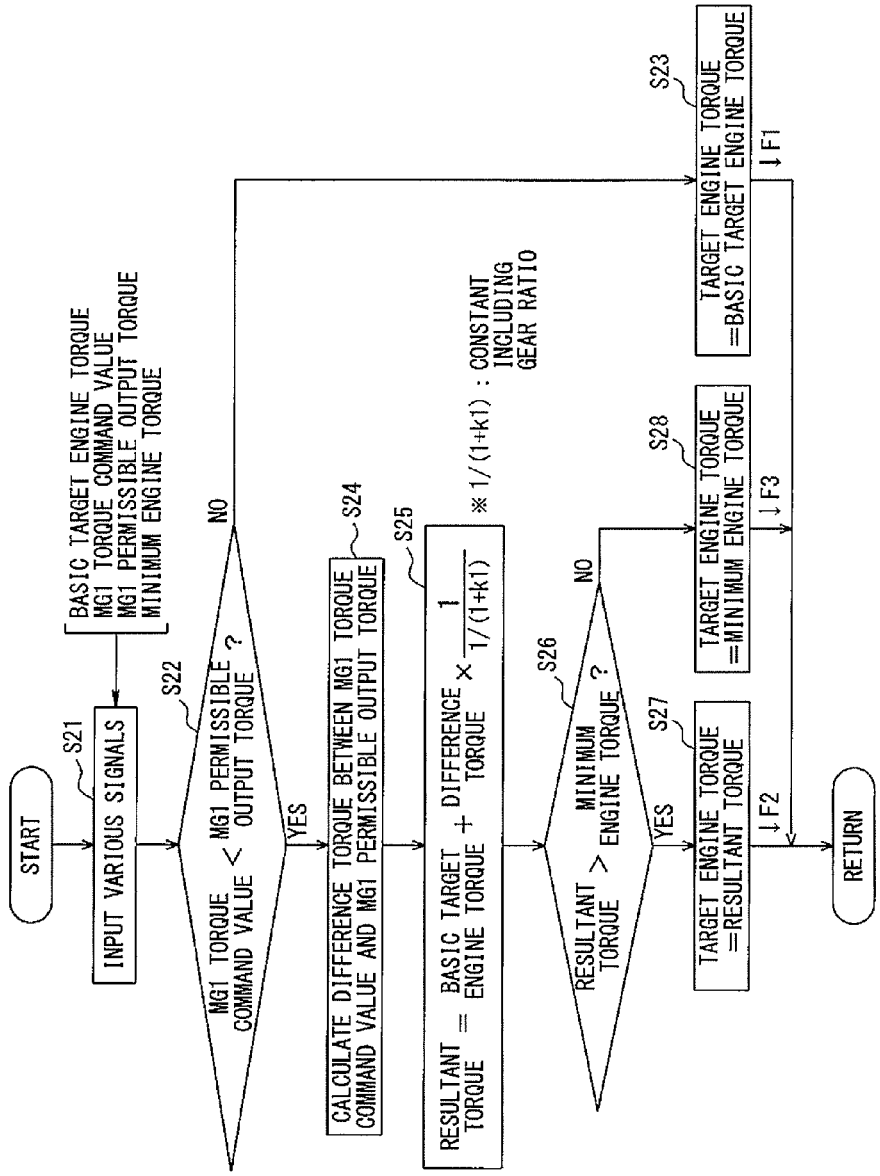
FIG. 10 is a flowchart showing a flow of control by the drive control apparatus according to the embodiment of the present invention.
Figure 11:
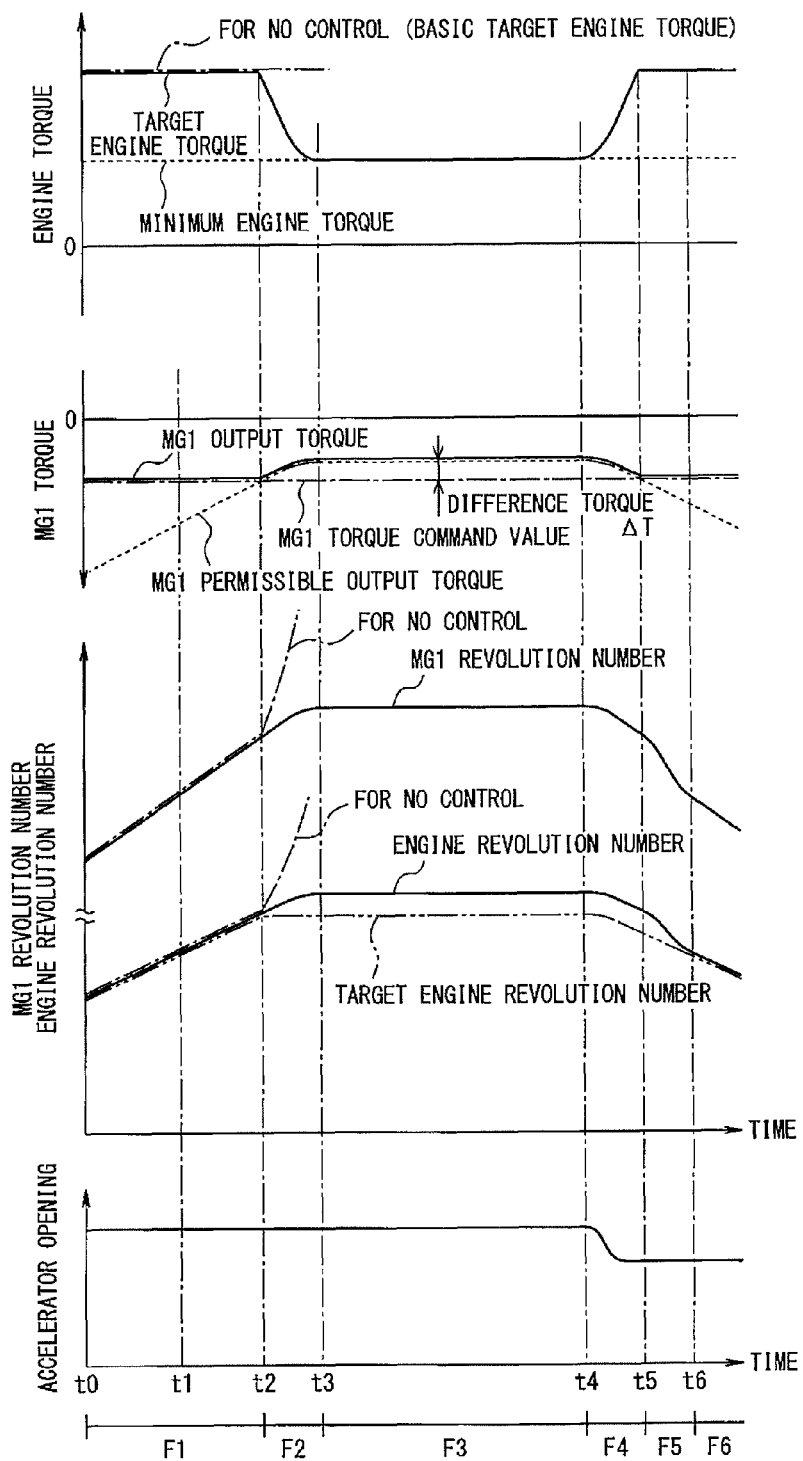
FIG. 11 is a timing chart showing transitions of respective torque and revolution numbers along with an over-speed prevention control in a normal state, as it is made by the drive control apparatus according to the embodiment of the present invention.
Figure 12:
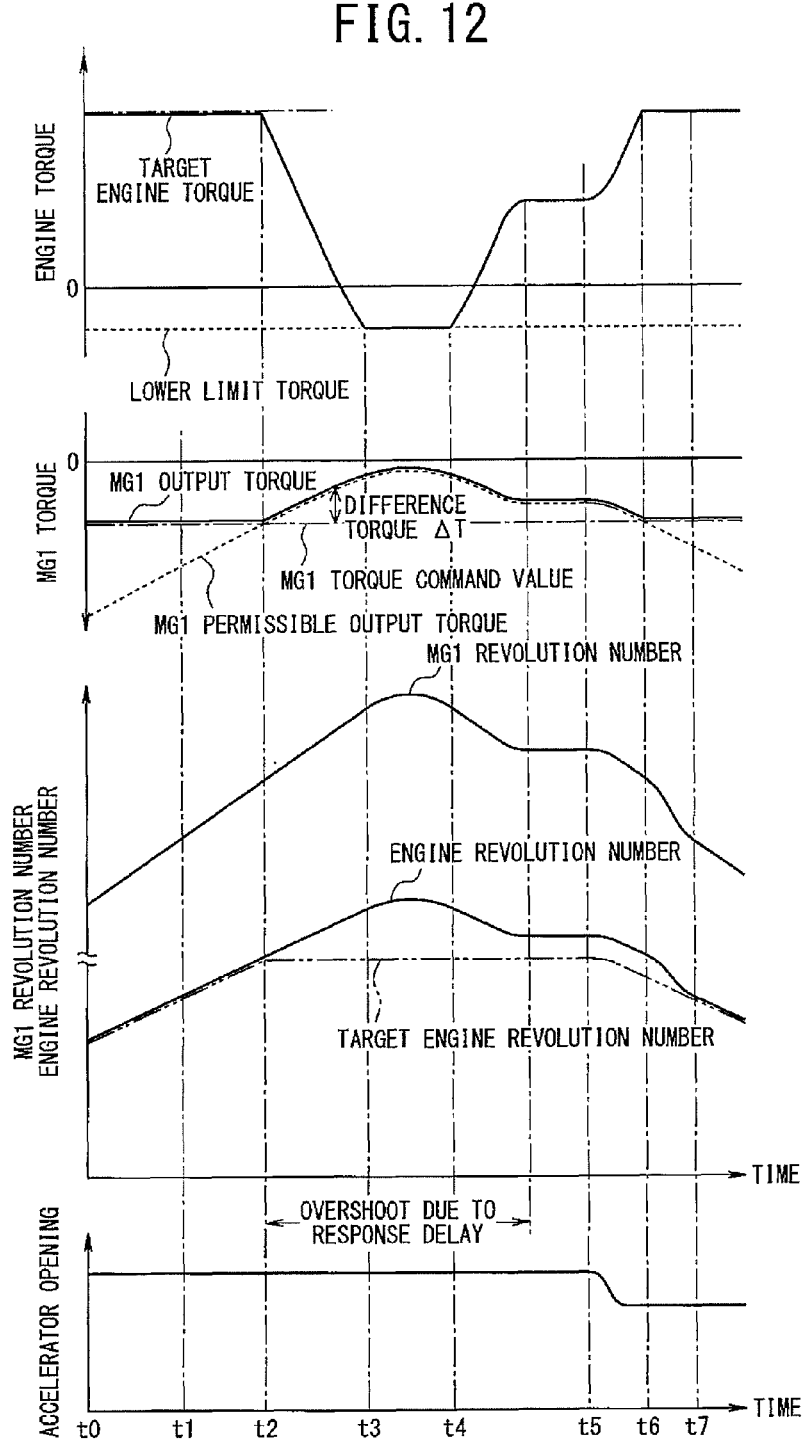
FIG. 12 is a timing chart showing transitions of respective torque and revolution numbers along with a normal over-speed prevention control, as it is made by the drive control apparatus according to the embodiment of the present invention.
Figure 13:
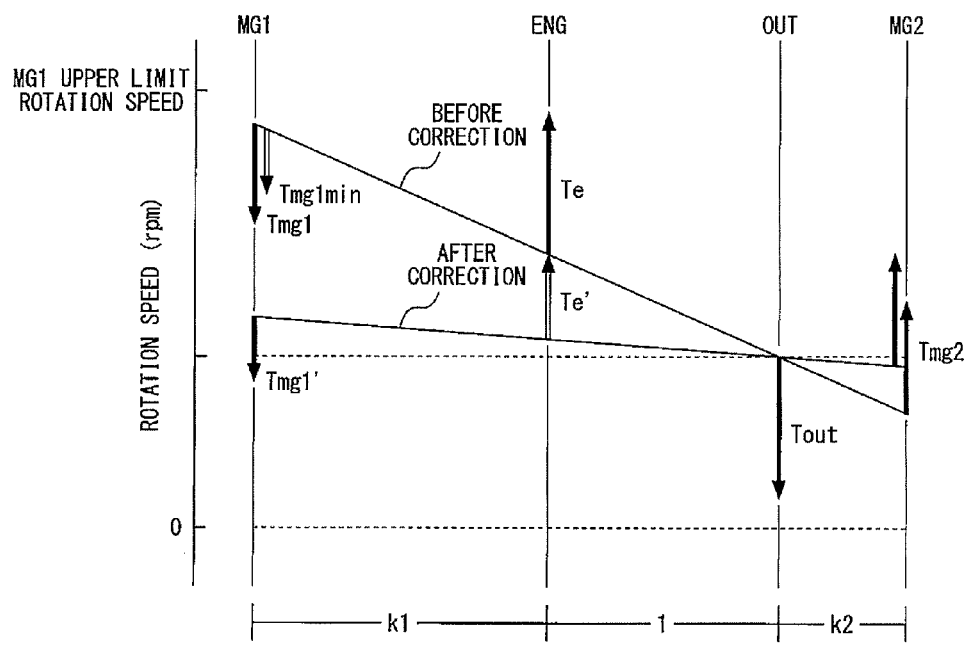
FIG. 13 is a collinear diagram showing states of a first motor, an engine, an output section, and a second motor before and after a correction of engine torque at the drive control apparatus according to the embodiment of the present invention.

FIG. 1 is a system configuration diagram of the drive control apparatus on the hybrid vehicle, FIG. 2 being a graph showing a target drive force retrieval map to be referred to when setting up a target drive force at a target drive force setter, FIG. 3 being a graph showing a target charge-discharge power retrieval map to be referred to when setting up target charge-discharge power at a target charge-discharge power setter, FIG. 4 being a graph showing a target engine operating point retrieval map to be referred to when setting up a target engine operating point at a target engine operating point setter, FIG. 5 being a control block diagram of the target engine operating point setter, FIG. 6 being a flowchart showing a flow of control at the target engine operating point setter, FIG. 7 being a control block diagram of a motor torque command value calculator, FIG. 8 being a flowchart showing a flow of control at the motor torque command value calculator, FIG. 9 being a control block diagram of an engine torque corrector, FIG. 10 being a flowchart showing a flow of control by the drive control apparatus according to the embodiment, FIG. 11 being a timing chart showing transitions of respective torque and revolution numbers along with an over-speed prevention control in a normal state, FIG. 12 being a timing chart showing transitions of respective torque and revolution numbers for over-speed prevention with a response delay, FIG. 13 being a collinear diagram covering a first motor, an engine, an output section, and a second motor, showing their states before and after a correction of engine torque.

[System Configuration of the Hybrid Vehicle]

Description is now made of a system configuration of the hybrid vehicle 100 according to the embodiment, with reference to FIG. 1. The hybrid vehicle 100 includes a drive train 1, and the drive control apparatus 32.

[Configuration of the Drive Train]

Description is now made of the drive train 1. As shown in FIG. 1, the drive train 1 includes an output shaft 3 of an engine 2, a combination of a first motor 4 (sometimes referred to as MG1) and a second motor 5 (sometimes referred to as MG2), drive axles 7, and a combination of a first planetary gear set 8 and a second planetary gear set 9. The first motor 4 and the second motor 5 serve as a first motor generator and a second motor generator, respectively, to produce drive forces when powered, and to produce electric energies when driven. The drive axles 7 are connected to drive wheels 6 of the hybrid vehicle 100. The first planetary gear set 8 and the second planetary gear set 9 are respectively interconnected among the output shaft 3, first motor 4, second motor 5, and drive axles 7.

The engine 2 is provided with an air flow controller 10 such as a throttle valve, a fuel feeder 11 such as a fuel injection valve, and an igniter 12 such as an ignition device. The air flow controller 10 adjusts the flow rate of intake air in correspondence to an accelerator opening (as a depression amount of the accelerator pedal). The fuel feeder 11 feeds a volume of fuel commensurate with the flow rate of intake air. The igniter 12 ignites the fuel. Using the air flow controller 10, fuel feeder 11, and igniter 12, the engine 2 keeps a controlled state of fuel combustion. The combustion of fuel produces a drive force.

The first motor 4 has a first motor stator 15, a first motor rotor 14, and a first motor rotor shaft 13. The second motor 5 has a second motor stator 18, a second motor rotor 17, and a second motor rotor shaft 16.

At the first motor 4, the first motor stator 15 is connected to a first inverter 19. At the second motor 5, the second motor stator 18 is connected to a second inverter 20. The first motor 4 and the second motor 5 are operable when supplied with electric power from a battery 21 being an electricity storage device to produce drive forces, and when driven for regeneration to produce electric energies to charge the battery 21. The electric power supply is controlled by the first inverter 19 and the second inverter 20 for the first motor 4 and the second motor 5, respectively.

The first planetary gear set 8 includes a first sun gear 22, a first ring gear 25, and a first planetary carrier 24 supporting first planetary gears 23. The first planetary gears 23 mesh with the first sun gear 22. The first planetary gears 23 are meshed with the first ring gear 25. The second planetary gear set 9 includes a second sun gear 26, a second ring gear 29, and a second planetary carrier 28 supporting second planetary gears 27. The second planetary gears 27 mesh with the second sun gear 26. The second planetary gears 27 are meshed with the second ring gear 29.

For the first planetary gear set 8 and the second planetary gear set 9, rotational centerlines of rotary elements are coaxially arranged. The first motor 4 is disposed in position between the first planetary gear set 8 and the engine 2. The second motor 5 is disposed in position on the far side of the second planetary gear set 9 relative to the engine 2. It is noted that the second motor 5 has a sufficient performance to make the hybrid vehicle 100 travel, simply on its own output.

At the first planetary gear set 8, the first sun gear 22 is connected to the first motor rotor shaft 13 of the first motor 4. The first planetary carrier 24 of the first planetary gear set 8 and the second sun gear 26 of the second planetary gear set 9 are coupled with each other, and connected to the output shaft 3 of the engine 2. The first ring gear 25 of the first planetary gear set 8 and the second planetary carrier 28 of the second planetary gear set 9 are coupled with each other, and connected to an output section 30. The output section 30 is connected to the drive axles 7, through an output transmission 31 using chains, gears, or such. At the second planetary gear set 9, the second ring gear 29 is connected to the second motor rotor shaft 16 of the second motor 5. In such a configuration of the drive train 1A, drive forces are transferred among the engine 2, the first motor 4, the second motor 5, and the drive axles 7.

The drive control apparatus 32 has connections with the air flow controller 10, fuel feeder 11, and igniter 12 of the engine 2, the first motor stator 15 of the first motor 4, and the second motor stator 18 of the second motor 5.

[Configuration of the Drive Control Apparatus]

As shown in FIG. 1, the drive control apparatus 32 is connected to an accelerator opening detector 33, a vehicle speed detector 34, an engine revolution number detector 35, and a battery charge state detector 36.

The drive control apparatus 32 includes a target drive force setter 37, a target drive power setter 38, a target charge-discharge power setter 39, a target engine power calculator 40, a target engine operating point setter 41, a motor torque command value calculator 42, an internal combustion engine controller 43, and an engine torque corrector 44.

The accelerator opening detector 33 detects an accelerator opening tvo being a depression amount of the accelerator pedal. The vehicle speed detector 34 detects a vehicle speed of the hybrid vehicle (as a vehicle speed) Vs. The engine revolution number detector 35 detects an engine revolution number Ne of the engine 2. The battery charge state detector 36 detects a state of charge SOC of the battery 21.

FIG. 5 is a control block diagram showing functions of target drive force calculator 37, target drive power calculator 38, target charge-discharge power calculator 39, target engine power calculator 40, and target engine operating point calculator 41 (including a target engine torque calculator 41A).

The target drive force calculator 37 is operable on a target drive force retrieval map, such as that illustrated in FIG. 2, for instance, to retrieve a target drive force Fdry in accordance with a combination of an accelerator opening (as a depression amount) tvo detected by the accelerator opening detector 33 and a vehicle speed Vs detected by the vehicle speed detector 34, to set up for use to drive the hybrid vehicle 100.

The target drive power calculator 38 is operable to set up target drive power Pdry based on a combination of an accelerator opening tvo detected by the accelerator opening detector 33 and a vehicle speed Vs detected by the vehicle speed detector 34. In this embodiment, the target drive power Pdry is set up by a multiplication of the target drive force Fdry and the vehicle speed Vs.

The target charge-discharge power calculator 39 is operable to set up target charge-discharge power Pbat based on, among others, at least a state of charge SOC of the battery 21 detected by the battery charge state detector 36. For example, in this embodiment, it is adapted to operate on a target charge-discharge power retrieval map, such as that illustrated in FIG. 3, for instance, to retrieve and set up target charge-discharge power Pbat in accordance with a state of charge SOC of the battery 21 and a vehicle speed Vs.

The target engine power calculator 40 is operable to calculate target engine power Peg from a combination of target drive power Pdry set up by the target drive power setter 38 and target charge-discharge power Pbat set up by the target charge-discharge power calculator 39. In this embodiment, the target charge-discharge power Pbat is subtracted from the target drive power Pdrv, to obtain the target engine power Peg.

The target engine operating point calculator 41 is operable on a target engine operating point retrieval map, such as that illustrated in FIG. 4, for instance, to retrieve and set up a target engine operating point (as a combination of target engine rotation speed and target engine torque) in accordance with the above-noted target engine power Peg and vehicle speed. It is noted that the target engine operating point setter 41 includes a target engine torque calculator 41A.

In the meanwhile, the internal combustion engine controller 43 is adapted to govern the air flow controller 10, fuel feeder 11, and igniter 12 under a drive control it makes based on target engine power Peg calculated by the target engine power calculator 40, so that the engine 2 operates on such an operating point as illustrated in FIG. 4 (as a combination of engine rotation speed and engine torque), where the engine 2 is operable with a favorable efficiency.

[Method of Calculating Target Engine Torque Operating Point]

FIG. 6 is a flowchart showing a course of control to be followed by the drive control apparatus 32 to calculate a target engine operating point (target engine rotation speed, target engine torque) from a combination of an amount of depression of an accelerator pedal by a driver and a vehicle speed. Description is now made of control actions up to the calculation of a target engine operating point, with reference to FIG. 6. This routine is repeated to execute at intervals of a prescribed time.

First (at a step S1), various signals are input, involving an accelerator opening tvo and a vehicle speed Vs.

Next (at a step S2), using a target drive force retrieval map such as that illustrated in FIG. 2, for instance, a target drive force is calculated in accordance with, among others, the accelerator opening (as a depression amount) tvo and the vehicle speed Vs. For a region of high vehicle speeds at an accelerator opening=0, the drive force set up has a negative value to act as a decelerating drive force equivalent to an engine brake. For a region of low speeds at an accelerator opening=0, it has a positive value affording for a creeping travel.

Next (at a step S3), for driving the vehicle with the target drive force calculated at the step S2, necessary power is calculated (as target drive power), by multiplication of the target drive force and the vehicle speed.

Next (at a step S4), using a target charge-discharge amount retrieval map such as that illustrated in FIG. 3, for instance, a charge-discharge amount is calculated by a retrieval thereon, as a target for use to control the state of charge SOC of the battery 21 within a normal service range. For low states of charge SOC, the charge power is increased to prevent over-discharge states of the battery 21. For high SOC states, the discharge power is increased to prevent over-charge states of the battery 21. As shown in FIG. 3, they are defined as positive values on the discharge side, and negative values on the charge side, for the convenience of handling.

Next (at a step S5), the power to be output by the engine (as target engine power) is calculated from the target drive power and the target charge-discharge power. At the step S5, the power to be output by the engine has a value equal to the necessary power to drive the vehicle plus the power to charge the battery 21 (or minus for discharge). Here, this is defined as a negative value on the charge side, so the target charge-discharge power is subtracted from the target drive power, to calculate the target engine power.

Next (at a step S6), using a target engine operating point retrieval map such as that illustrated in FIG. 4, for instance, a target engine operating point is calculated in accordance with the target engine power and the vehicle speed, before going to a return.

The target engine operating point retrieval map has target operating point lines set up as lines connecting points selected every power on equi-power lines, to be efficient with respect to an entire efficiency of the engine 2 added by an efficiency of a power transmission system composed of the first planetary gears 23, the second planetary gears 27, the first motor 4, and the second motor 5. The target operating point lines are set up every vehicle speed. Values thus set up may be empirically determined, or determined by calculations from efficiencies of the engine 2, the first motor 4, and the second motor 5.

[Method of Calculating Motor Torque Commands]

Description is now made of a configuration of and a calculation method at the motor torque command value section 42 adapted to calculate motor torque command values for the first motor 4 and the second motor 5, with reference to FIG. 7 and FIG. 8. FIG. 7 is a control block diagram showing part of a motor torque command value calculating function to be executed at the motor torque command value calculator 42, FIG. 8 being a flowchart therefor.

The motor torque command value calculator 42 is operable to calculate torque command values of the first motor 4 (MG1) and the second motor 5 (MG2), respectively, using an electric power balance expression involving target charge-discharge power, and a toque balance expression involving target engine torque determined from the above-noted target engine operating point. The toque balance expression as well as the electric power balance expression will be described later on.

As shown in FIG. 7, there is a combination of rotation speeds (Nmg1, Nmg2) calculated with respect to the first motor 4 and the second motor 5, respectively, using a vehicle speed, and a target engine rotation speed determined from a target engine operating point calculated at the target engine operating point setter 41 (refer to FIG. 5). For the first motor 4, a torque command value (Tmg1$i$) is calculated based on the rotation speeds (Nmg1, Nmg2) of the first motor 4 and the second motor 5, target charge-discharge power, and target engine torque.

Then, for the second motor 5, a torque command value (Tmg2$i$) is calculated based on the torque command value (Tmg1$i$) of the first motor 4 and the target engine torque. Further, the motor torque command value calculator 42 operates to set feedback correction amounts (Tmg1$fb$, Tmg2$fb$) to the torque command values of the first motor 4 and the second motor 5, respectively, to have an actual engine rotation speed converged on the target engine rotation speed determined from the target engine operating point. Accordingly, there is a combination of a torque command value (Tmg1) calculated for the first motor 4 from the torque command value (Tmg1$i$) and the feedback correction amount (Tmg1$fb$) of the first motor 4 and a torque command value (Tmg2) calculated for the second motor 5 from the torque command value (Tmg1$i$) and the feedback correction amount (Tmg2$fb$) of the second motor 5.

Description is now made along with a flowchart shown in FIG. 8. This routine is repeated to execute at intervals of a prescribed time. At a step S11 shown in FIG. 8, first, drive shaft rotation speeds No of the first planetary gear set 8 and the second planetary gear set 9 are calculated from a vehicle speed. Then, when the engine rotation speed has become a target engine rotation speed Net, a rotation speed Nmg1 of the first motor 4 and a rotation speed Nmg2 of the second motor 5 are calculated, using expressions (1) and (2) defined below. The expressions for calculation are determined from relationships between rotation speeds at the first planetary gear set 8 and the second planetary gear set 9.

$$Nmg1 = (Net - No) * k1 + Net \quad (1),$$

$$Nmg2 = (No - Net) * k2 + No \quad (2).$$

Here, k1 and k2 have values shown in a collinear diagram of FIG. 13, depending on gear ratios at the first planetary gear set 8 and the second planetary gear set 9. More specifically, in this embodiment, k1 and k2 are defined as follows:

$$k1 = ZR1/ZS1$$

$$k2 = ZR2/ZS2$$

ZS1 = teeth number of the first sun gear 22 at the first planetary gear set 8

ZR1 = teeth number of the first ring gear 25 at the first planetary gear set 8

ZS2 = teeth number of the second sun gear 26 at the second planetary gear set 8

ZR2 = teeth number of the second ring gear 29 at the second planetary gear set 8

Next, at a step S12, basic torque Tmg1$i$ of the first motor 4 is calculated from the rotation speed Nmg1 of the first motor 4 and Nmg2 of the second motor 5, as they are determined at the step S11, and a combination of target charge-discharge power Pbat and target engine torque Tet, using an expression (3) for calculation, such that:

$$Tmg1i = (Pbat*60/2\pi - Nmg2*Tet/k2)/(Nmg1 + Nmg2*(1+k1)/k2) \quad (3)$$

This expression (3) for calculation can be derived by solving a simultaneous equation composed of a torque balance expression (4) representing a balance of torque input to the planetary gear sets, as shown below, and an electric power balance expression (5) representing electric power generated or consumed at the first motor 4 and the second motor 5 being equal to electric power (Pbat) input to or output from the battery 21.

$$Tet + (1+k1)*Tmg1 = k2*Tmg2 \quad (4),$$

$$Nmg1*Tmg1*2\pi/60 + Nmg2*Tmg2*2\pi/60 = Pbat \quad (5).$$

Next, at a step S13, basic torque Tmg2$i$ of the second motor 5 is calculated from Tmg1$i$ and target engine torque, using an expression (6), such that:

$$Tmg2i = (Tet + (1+k1)*Tmg1i)/k2 \quad (6).$$

It is noted that this expression (6) is derived from the expression (4) above.

Next, at a step S14, in order to get an engine rotation speed approaching the target, the deviation of engine rotation speed relative to the target is multiplied by a prescribed feedback gain set in advance, to calculate feedback correction torque Tmg1*fb* and Tmg2*fb* of the first motor 4 and the second motor 5.

Next, at a step S15, the feedback correction torque Tmg1*fb* and Tmg2*fb* of the first motor 4 and the second motor 5 are added to the basic torque Tmg1*i* and Tmg2*i*, to calculate torque command values Tmg1 and Tmg2 for the first motor 4 and the second motor 5, respectively. The first motor 4 and the second motor 5 are controlled following such control commands, to output target drive forces, making charge and discharge to the battery 21 as target values.

[Configuration of the Engine Torque Corrector]

Description is now made of the engine torque corrector 44, with reference to FIG. 9. FIG. 9 is a diagram showing control blocks of the engine torque corrector 44. The engine torque corrector 44 is adapted to set up target engine torque, for correction of engine torque.

As shown in FIG. 9, the engine torque corrector 44 includes a permissible output torque calculator 44A, a difference torque calculator 44B, an engine torque correction component calculator 44C, a resultant torque calculator 44D, and a target engine torque correction value calculator 44E.

The permissible output torque calculator 44A calculates permissible output torque (as minimum value) from a revolution number Nmg1 of the first motor 4 (MG1).

The difference torque calculator 44B calculates difference torque ΔT between the permissible output torque calculated at the permissible output torque calculator 44A and a torque command value of the first motor 4 (MG1) determine by the above-noted motor torque command value calculation method.

At the engine torque correction component calculator 44C, the difference torque ΔT calculated at the difference torque calculator 44B is converted (multiplied) by (an inverse: 1/(1+k1) of (1+k1) being) a constant including a gear ratio at the planetary gear sets, to calculate an engine torque correction component.

The resultant torque calculator 44D calculates resultant torque from the target engine torque and the engine torque correction component.

The target engine torque correction value calculator 44E is adapted to output a target engine torque correction value determined from the resultant torque and minimum engine torque, for use to correct engine torque. It is noted that the minimum engine torque is engine torque (inherent motoring torque of the engine 2) set up based on inherent characteristics of the engine 2 to guard the rotation against decrease, keeping a minimum necessary of rotation drive.

[Control for Over-Speed Prevention]

FIG. 10 is a flowchart showing a performance of control using a target engine torque correction value calculated at the engine torque corrector 44, to prevent overs speeds of the first motor 4. Description is now made of the content of control preventing over speeds of the first motor 4, with reference to the flowchart in FIG. 10. This routine is repeated to execute at intervals of a prescribed time.

As shown in FIG. 10, first, at a step S21, various signals are input, including basic target engine torque before correction of engine torque, a toque command value for the first motor 4 (MG1), permissible output torque (as a minimum value) of the first motor 4, minimum engine torque (as motoring torque), etc.

Next (at a step S22), at the engine torque corrector 44, it is determined whether or not the toque command value of the first motor 4 is smaller than the permissible output torque (as the minimum value).

At the step S22 (if it is 'NO', that is), if the toque command value of the first motor 4 is larger than the permissible output torque (as the minimum value), then target engine torque should be equal to basic target engine torque. No correction to engine torque is made (at a step S23), before going to a return (along a flow F1 in the flowchart).

At the step S22 (if it is 'YES', that is), if the toque command value of the first motor 4 is smaller than the permissible output torque (as the minimum value) (i.e. if the toque command value is larger in the absolute value than the permissible output torque), then (at a step S24) difference torque ΔT (refer to FIG. 11) between the torque command value of the first motor 4 and the permissible output torque of the first motor 4 is calculated.

Next (at a step S25), between the basic target engine torque and the difference torque ΔT calculated at the step S24, as it is converted by the constant including gear ratio, there is made a calculation by multiplication in between, as a calculation of the basic target engine torque to obtain resultant torque.

Next (at a step S26), it is determined whether or not the resultant torque is larger than the minimum engine torque.

If the resultant torque is larger than the minimum engine torque (YES) at the step S26, then the resultant torque is set up as target engine torque (at a step S27), before going to the return (along a flow F2 in the flowchart).

If the resultant torque is not larger than the engine minimum torque (NO) at the step S26, then the minimum engine torque is set up as target engine torque (at a step S28), before going to the return (along a flow F3 in the flowchart).

Description is now made of transitions of torque and revolution number at the first motor 4 and torque and revolution number at the engine 2 in examples of control executed to prevent over speeds of the first motor 4 by the drive control apparatus 32 and a drive control method according to the embodiment, with reference being made to FIG. 11 and FIG. 12. FIG. 11 is a timing chart showing transitions of respective torque and revolution numbers along with an over-speed prevention control in a normal state. FIG. 12 is a timing chart showing transitions of respective torque and revolution numbers for over-speed prevention with a response delay.

[Example of Over-Speed Prevention Control in a Normal State]

The timing chart shown in FIG. 11 describes a control to be executed by the drive control apparatus 32 and a drive control method according to the embodiment, in a situation in which the engine 2 has a varied output characteristic due to disturbances such as variations in the environment, such as those in the temperature of suction air or in the atmospheric pressure, for instance, where the first motor 4 being driven to rotate might have a revolution number exceeding a specific upper limit of revolution number, reaching a high revolution number range, entering an over-speed state.

At an interval between times t0 and t1 shown in FIG. 11, the first motor 4 (MG1) has a torque command value (MG1 torque command value) kept constant. Moreover, permissible output torque of the first motor 4 (MG1 permissible minimum output torque) has a smaller value (as a larger value in the absolute value at the negative side) than the torque command value. In other words, both the torque command value and the permissible output torque of the first motor 4 are produced to be negative torque, which are handled as values of torque that may have a positive sign or a negative sign whichever is adopted for the control purpose, so the value larger in the absolute value becomes small as a value for the control.

Moreover, the accelerator opening detector 33 shown in FIG. 1 has a value, which is a normal state being a prescribed opening (as a depression amount). In this state being a normal state, the target engine torque (basic target engine torque) is constant, as shown in FIG. 11. Further, the revolution number of the first motor 4 and the engine revolution number have tendencies to increase, due to disturbances such as those accompanied by changes in environment and the like, for instance. During the interval between times t0 and t1, no correction is applied to target engine torque, in a state of control corresponding to the flow F1 in the flowchart of FIG. 10.

Next, at an interval between times t1 and t2 shown in FIG. 11, the state to be pointed may involve a situation in which the first motor 4, driven to rotate when the output characteristic of the engine has varied due to the above-noted disturbances such as changes in environment, may proceed to have a revolution number exceeding the specific upper limit of revolution number, reaching the high revolution number range, heading for an over-speed state. Namely, this is an interval in which the state moves in the direction that might involve an over speed at the first motor 4. (Note that in this embodiment, engine torque is corrected, preventing over speeds).

At the interval between t1 and t2, permissible output torque is produced as negative torque, so the permissible negative output torque has a reduced absolute value, having started getting nearer to the torque command value. That is, the first motor 4 has a revolution number approaching the upper limit range, and permissible minimum output torque having started decreasing in the absolute value, toward a zero (0). On the other hand, when compared with permissible output torque of the first motor 4, the torque command value to be constant is still large, as a numeric value of torque that may have a positive sign or a negative sign whichever is adopted (Note that the permissible minimum output torque is larger in the absolute value than the torque command value). At the interval between t1 and t2, torque at the first motor 4 is equal to the torque command value. During the interval between t1 and t2, the state of control follows the flow F1 in the flowchart of FIG. 10, like the interval between t0 and t1.

Then, at the point of time t2 shown in FIG. 11, the first motor 4 has a torque command value coincident with permissible output torque. At an interval between t2 and t3, as a numeric value of torque at the first motor 4 that may have a positive sign or a negative sign whichever is adopted, permissible output torque exceeds torque command value (i.e. becomes smaller in the absolute value), so the actual torque command value becomes equal to permissible output torque. There is a deviation developed between torque command value and actual torque command value (permissible output torque).

Here, like the calculation at the step S25 in the flowchart shown in FIG. 10, difference torque $\Delta T$ at the first motor 4 is converted by the constant including gear ratio, and basic target engine torque is corrected by thus converted torque, to provide resultant torque as a final target engine torque command value. It is noted that such the calculation of final target engine torque command value is performed at the target engine torque correction value setter 44E in the engine torque corrector 44, as shown in FIG. 9.

At the interval between t2 and t3, there is a gradually increasing difference between torque command value and permissible output torque, whereby the correction of engine torque based on the step S27 provides target engine torque (as resultant torque) with a gradually decreasing tendency. As a result, the target engine torque tends to decrease, suppressing sudden increases in the revolution number of the first motor 4 and engine revolution number. Like this, when the engine torque correction control is not executed, negative torque at the first motor 4 (MG1) is substantially lost, accompanying a blow-up of engine revolution number, causing the revolution number to rise as shown by alternate long and short dash lines in FIG. 11. In conjunction therewith, also the revolution number of the first motor 4 (MG1) rises as shown by alternate long and short dash lines in FIG. 11. Therefore, over speeds of the first motor 4 (MG1) can be prevented by the engine torque correction control. Such being the case, during the interval between t2 and t3, the state of control follows the flow F2 in the flowchart of FIG. 10.

At the point of time t3 shown in FIG. 11, target engine torque coincides with minimum engine torque (as specific motoring torque of the engine 2). At an interval between t3 and t4, the target engine torque simply adopts a positive value, and falls below the minimum engine torque, so the actual target engine torque becomes equal to the minimum engine torque. That is, the minimum engine torque serves as a lower limit value to guard the target engine torque from getting below the minimum engine torque. Engine torque has a balanced state at a low value, so the revolution number of the engine 2 as well as the revolution number of the first motor 4 has a tendency to converge on an arbitrary revolution number, as it is changed from the tendency to decrease. Such being the case, during the interval between t3 and t4, the state of control follows the flow F3 in the flowchart of FIG. 10. It is noted that in the interval between t3 and t4, if the target engine torque is not decreased down to the minimum engine torque, it is not guarded by the minimum engine torque, but the target engine torque gets balanced with a prescribed torque value.

At the point of time t4 shown in FIG. 11, the accelerator opening detector 33 detects an accelerator off state, which serves as a trigger for the engine torque correction to start changing toward a restoration to target engine torque. In response to the trigger, the revolution number of the engine 2 as well as the revolution number of the first motor 4 (MG1) starts decreasing, whereby the first motor 4 (MG1) has permissible output torque (maximum output torque at the negative side) gradually increased in the absolute value, with reduced difference torque $\Delta T$. Along therewith, also the decrease amount in the torque correction control of the engine 2 becomes gradually small, up to a complete restoration at a point of time t5. During an interval between t4 and t5, the state of control follows the flow F2 in the flowchart of FIG. 10.

At an interval between t5 and t6, when compared with permissible minimum output torque of the first motor 4, the torque command value to be constant is large, as a numeric value of torque that may have a positive sign or a negative sign whichever is adopted, similarly to the interval between t1 and t2. Therefore, no deviation develops, resulting in no correction applied to engine torque. Engine torque has a decreasing tendency depending on variations of travel in the course of over-speed prevention up to a restoration, while also revolution number of the first motor 4 and the engine revolution number have decreasing tendencies. During the interval between t5 and t6, the state of control follows the flow F1 in the flowchart of FIG. 10.

[Example of Over-Speed Prevention Control with a Response Delay in the Prevention of Rotation]

If the over-speed prevention along with engine torque correction has a response delay, there should be employed such an example of control for over-speed prevention as shown by a timing chart in FIG. 12.

As shown in FIG. 12, torque correction control (torque decrease control) of the engine 2 may be delayed, causing a large increase in rotation of the engine 2, resulting in an over shoot. It is noted that up to a point of time t2 shown in FIG. 12, the history of state is similar to that up to the point of time t2 shown in FIG. 11. At an interval between t2 and t3, the difference between a torque command value and permissible output torque of the first motor 4 (MG1) is converted by the constant including gear ratio, and the converted value is added to target engine torque, to provide resultant torque for use to control the target engine torque, while at the initial stage of the first motor 4 (MG1) the difference torque ΔT is increased by the response delay and the like, as the rotation speed increases.

Therefore, as shown in FIG. 12, torque at the engine 2 is continuously decreased by the correction of engine torque, reaching lower limit torque (motoring torque) in due course. The lower limit torque (motoring torque) is an eigen value of the engine 2 unable to change. The rotation speed may be increased for some reason. However, as no drive force is supplied, also the increase in rotation speed gradually becomes dull. In due course, the rotation speed starts decreasing (at a point of time t4). Along therewith, the difference between torque command value and permissible output torque of the first motor 4 (MG1) becomes small, as well as the amount of torque correction control (decrease control) at the engine 2. It is noted that target engine revolution numbers are described by alternate long and two short dashes lines along engine revolution numbers in FIG. 11 and FIG. 12.

The decrease amount in the torque correction control (decrease control) at the engine 2 gradually becomes small, ridding occurrence of overshoot in due course, getting balanced like the control for over-speed prevention shown in FIG. 11. Then, like the control for over-speed prevention shown in FIG. 11, a slight return of accelerator by the driver is taken as a trigger, to make a correction of target engine torque for restoration.

FIG. 13 is a collinear diagram showing states before and after a correction of target engine torque. It is noted that k1 and k2 shown in FIG. 13 are values depending on gear ratios at the first planetary gear set 8 and the second planetary gear set 9.

As shown in FIG. 13, before a correction of engine torque, the revolution number of the engine 2 and the revolution number of the first motor 4 are both high, and the torque command value Tmg1 of the first motor 4 is larger than permissible minimum output torque Tmg1min. After the correction of engine torque, target engine torque is corrected as resultant torque, whereby engine torque Te is decreased to Te'. Along with the decrease in engine torque, the revolution number of the engine 2 and the revolution number of the first motor 4 are decreased. Such a correction of engine torque allows for a over-speed prevention of the first motor 4.

According to the drive control apparatus 32 of the hybrid vehicle 100 described, target engine torque is corrected by a relationship between permissible minimum output torque and torque command value of the first motor 4, permitting engine torque to be suppressed in advance, allowing for a facilitated control of revolution speed at the engine 2. As result, over speeds of the first motor 4 can be prevented.

Moreover, in the drive control apparatus 1 for hybrid vehicles according to the embodiment, as shown in FIG. 11, minimum engine torque is set to target engine torque of the engine 2, and the minimum engine torque is compared with target engine torque after correction, to take whichever is larger in between, as final target engine torque. Therefore, even in a situation in which the target engine torque is significantly suppressed by a relationship between permissible output torque and torque command value of the first motor 4, minimum engine torque can be saved as the necessary minimum. Accordingly, engine torque stabilized, allowing for secured system integrity.

Further, in the drive control apparatus 1 for hybrid vehicles according to the embodiment, no correction is made to target engine torque when the first motor 4 has a torque command value larger than permissible output torque. In this case, no limitation to engine torque is done, thus preventing the engine torque from being limited more than necessary.

[Other Embodiments]

While embodiments of the present invention have been described, discussions as well as drawings constituting part of disclosure of those embodiments should not construed restrictive to the invention, and the invention covers any and all embodiments that has equivalent effects to what the object of invention covers. Further, the scope of the invention is not limited to combinations of aspects of the invention defined by appended claims, but may well be defined by any and all desirable combinations of specific characteristics among all disclosed characteristics.

For instance, the drive control apparatus 32 as well as the hybrid vehicle 100 according to the embodiment may have, besides the engine torque correction control, a concurrently employed control to change the target engine revolution number of the engine 2 in a decreasing manner, when the actual revolution number of the first motor 4 (MG1) has reached an upper limit of revolution number. In this case, the revolution number to be set may be decreased from the target engine revolution number by a prescribed revolution number, for instance.

Although the embodiment described includes, as shown in FIG. 1, a planetary gear set composed of the first planetary gear set 8 and the second planetary gear set 9 for interconnection among four elements being the output shaft 3 of the engine 2, the first motor 4 (MG1), the second motor 5 (MG2), and the drive axels 7, there may well be any planetary gear set else employed for interconnection among the four elements, within the scope of the invention.

REFERENCE SIGNS LIST 1 drive train
2 engine (internal combustion engine)
3 output shaft
4 first motor
5 second motor
6 wheel
7 drive axle
8 first planetary gear set
9 second planetary gear set
30 output section
32 drive control apparatus
33 accelerator opening detector
34 vehicle speed detector
35 engine revolution number detector
37 target drive force setter
41A target engine torque setter
44 engine torque corrector
44A permissible output torque calculator
44B difference torque calculator
44C engine torque correction component calculator
44D resultant torque calculator
44F target engine torque correction value setter
100 hybrid vehicle

The invention claimed is:

1. A drive control apparatus for a hybrid vehicle using outputs from an internal combustion engine and a motor generator, the drive control apparatus comprising:
a target engine torque setter configured to set a target engine torque of the internal combustion engine;
a motor torque command value calculator configured to set a torque command value of the motor generator; and
an engine torque corrector configured to make a correction of the target engine torque by a target engine torque correction value which is set based on a permissible output torque of the motor generator and the torque command value of the motor generator,
wherein the engine torque corrector is configured to compare the torque command value of the motor generator to the permissible output torque of the motor generator and make the correction by decreasing the target engine torque when an absolute value of the permissible output torque of the motor generator is smaller than an absolute value of the torque command value of the motor generator.

2. The drive control apparatus according to claim 1, wherein the engine torque corrector includes:
a permissible output torque calculator configured to calculate the permissible output torque of the motor generator based on a revolution of the motor generator;
a difference torque calculator configured to calculate a difference torque between the permissible output torque of the motor generator and the torque command value of the motor generator;
an engine torque correction component calculator configured to make a conversion of the difference torque to calculate an engine torque correction component;
a resultant torque calculator configured to make an addition between the target engine torque and the engine torque correction component to calculate a resultant torque; and
a target engine torque correction value setter configured to set the target engine torque correction value based on the resultant torque.

3. The drive control apparatus according to claim 2, wherein the engine torque corrector is configured to set a minimum engine torque to the target engine torque, and take a larger one of the minimum engine torque and the resultant torque after a comparison between the minimum engine torque and the resultant torque to set as the target engine torque correction value.

4. The drive control apparatus according to claim 1, wherein the motor generator is a first motor generator;
wherein the drive control apparatus further comprises a second motor generator and a planetary gear set, the planetary gear set having four elements which are connected to the first motor generator, the internal combustion engine, an output section, and the second motor generator in this order on a collinear diagram; and
wherein the permissible output torque of the motor generator is a permissible output torque of the first motor generator and the torque command value of the motor generator is a torque command value of the first motor generator.

5. The drive control apparatus according to claim 1, further comprising a target engine operating point setter including the target engine torque setter, the target engine operating point setter being configured to set a target engine operating point to determine a target engine rotation speed and the target engine torque of the internal combustion engine in consideration of the whole system efficiency and a target engine power.

6. The drive control apparatus according to claim 5, further comprising a target engine power calculator configured to calculate the target engine power from a target drive power and a target charge-discharge power.

7. The drive control apparatus according to claim 6, further comprising a target drive power calculator configured to set the target drive power based on an accelerator opening and a vehicle speed.

8. The drive control apparatus according to claim 6, further comprising a target charge-discharge power calculator configured to calculate the target charge-discharge power based on a state of charge of a battery.

9. The drive control apparatus according to claim 7, further comprising an accelerator opening detector configured to detect the accelerator opening.

10. The drive control apparatus according to claim 7, further comprising a vehicle speed detector configured to detect the vehicle speed.

11. The drive control apparatus according to claim 8, further comprising a battery charge state detector configured to detect the state of charge of the battery.

12. A drive control method for a hybrid vehicle using outputs from an internal combustion engine and a motor generator, the drive control method comprising:
determining a target engine torque of the internal combustion engine in consideration of the entire system efficiency and a target engine power;
comparing a torque command value of the motor generator to a permissible output torque of the motor generator; and
decreasing the target engine torque of the internal combustion engine when an absolute value of the permissible output torque of the motor generator is smaller than an absolute value of the torque command value of the motor generator.

13. The drive control method according to claim 12, further comprising setting a minimum engine torque to the target engine torque, and keeping the target engine torque from falling below the minimum engine torque when the target engine torque is decreased.

14. A hybrid vehicle comprising:
a target engine torque setter configured to set a target engine torque of the internal combustion engine;
a motor torque command value calculator configured to set a torque command value of the motor generator; and
an engine torque corrector configured to make a correction of the target engine torque by a target engine torque correction value which is set based on a permissible output torque of the motor generator and the torque command value of the motor generator,
wherein the engine torque corrector is configured to make the correction by decreasing the target engine torque when an absolute value of the permissible output torque of the motor generator is smaller than an absolute value of the torque command value of the motor generator.

15. In a hybrid vehicle:
a first planetary gear set including a first sun gear, a first ring gear, and a first planetary carrier which supports first planetary gears meshed with the first sun gear and the first ring gear;
a second planetary gear set including a second sun gear, a second ring gear, and a second planetary carrier which supports second planetary gears meshed with the second sun gear and the second ring gear, the second sun gear being connected to the first planetary carrier, the second planetary carrier being connected to the first ring gear;

a drive control apparatus providing a target engine torque, a first torque command value and a second torque command value;

a first motor generator connected to the first sun gear, the first motor generator being operable on the first torque command value;

an internal combustion engine connected to the second sun gear, the internal combustion engine being operable on the target engine torque;

an output section connected to the first ring gear; and a second motor generator connected to the second ring gear, the second motor generator being operable on the second torque command value, the drive control apparatus configured to:

(a) determine a permissible output torque of the first motor generator;

(b) compare the first torque command value to the permissible output torque; and (c) decrease the target engine torque when an absolute value of the permissible output torque is smaller than an absolute value of the first torque command value.

* * * * *